United States Patent [19]

Loreck

[11] 4,393,447
[45] Jul. 12, 1983

[54] METHOD AND A CIRCUIT FOR CONTROLLING THE PRESSURE IN WHEEL BRAKE CYLINDERS OF FLUID-OPERATED VEHICULAR BRAKES

[75] Inventor: Heinz Loreck, Moedling, Austria

[73] Assignee: ITT Industries, Inc., New York, N.Y.

[21] Appl. No.: 214,405

[22] Filed: Dec. 8, 1980

[30] Foreign Application Priority Data

Dec. 21, 1979 [DE] Fed. Rep. of Germany ....... 2951756

[51] Int. Cl.³ .............................................. B60T 8/02
[52] U.S. Cl. .................................... 364/426; 303/105; 303/106; 303/110
[58] Field of Search ....................... 303/105, 106, 110; 364/426

[56] References Cited

U.S. PATENT DOCUMENTS

| | | | |
|---|---|---|---|
| 4,061,403 | 12/1977 | Peterson et al. | 303/106 |
| 4,113,322 | 9/1978 | Ruhran et al. | 303/105 |
| 4,209,202 | 6/1980 | Jones | 303/106 |
| 4,212,499 | 7/1980 | Jones | 303/103 |

Primary Examiner—J. V. Truhe
Assistant Examiner—S. M. Bergmann
Attorney, Agent, or Firm—John T. O'Halloran; Alfred C. Hill

[57] ABSTRACT

It is known that an output valve providing a pressure decrease in a wheel brake cylinder can be controlled by a pulse train which is variable in response to the acceleration or deceleration of the associated wheel. A disadvantage of such an arrangement is that a wheel at standstill will not be able—under certain circumstances—to accelerate again during a control cycle. Additionally, the wheel brake cylinder pressure may have been decreased to such an extent that the wheel will neither continue to decelerate, or accelerate sufficiently. According to the present invention the control behavior is improved in these critical cases by generating pulses proportional to wheel acceleration and to transmit an opening signal to the outlet valve upon cessation of the accelerating pulses. The opening signal is immediately switched off as soon as the acceleration pulses occur again.

8 Claims, 1 Drawing Figure

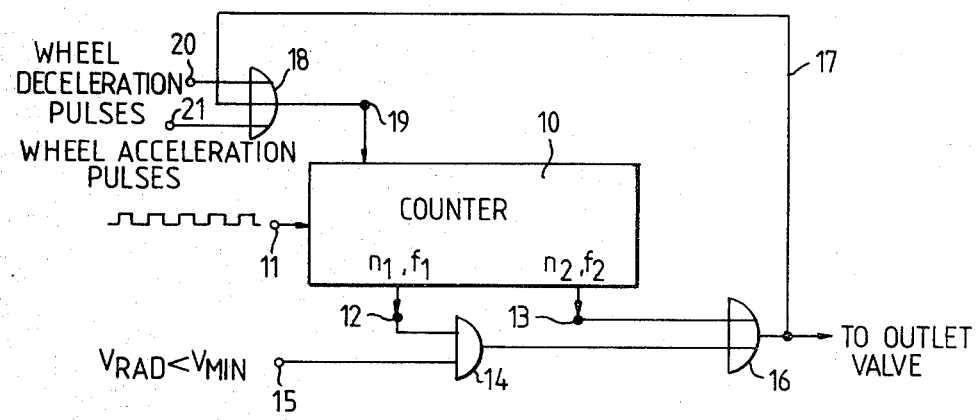

METHOD AND A CIRCUIT FOR CONTROLLING THE PRESSURE IN WHEEL BRAKE CYLINDERS OF FLUID-OPERATED VEHICULAR BRAKES

BACKGROUND OF THE INVENTION

The present invention relates to a method and a circuit for controlling the pressure in wheel brake cylinders of fluid-operated vehicular brakes, wherein a pulse train controlling the associated outlet valve is supplied to the outlet valves associated with the brake cylinders dependent on predeterminable differences between a reference velocity and the velocity of an associated wheel, with the pulse train being variable in response to the deceleration (negative acceleration) or positive acceleration of the associated wheel.

In antiskid systems operating according to this known principle, cases may occur where the pressure decrease in the wheel brake cylinders cannot be ensured in the manner required for reliable operation of the system.

The most frequently occurring case is that a control cycle is initiated at such a low speed that the wheel concerned comes to a standstill before a sufficient pressure decrease could be accomplished. Because the wheel is at a standstill, no further deceleration signals are produced, and as a result no further pressure decrease can take place.

Another undesirable state is the case where the pressure decrease in a wheel brake cylinder attains exactly a magnitude at which the wheel does not continue decelerating while at the same time the wheel has not yet accelerated again sufficiently.

SUMMARY OF THE INVENTION

It is an object of the present invention to improve upon the known method for controlling the pressure decrease in wheel brake cylinders of fluid-operated vehicular brakes such that in the critical cases, where the pressure decrease in a wheel brake cylinder does not suffice for the normal performance of a control cycle and where no wheel deceleration or wheel acceleration pulses are present, it is ensured that the critical state is immediately eliminated and that the control cycle can be executed normally.

Another object of the present invention is to provide a circuit to carry out the above method.

A feature of the present invention is the provision of, in a method for controlling pressure in a wheel brake cylinder by a control pulse train proportional to acceleration or deceleration of an associated wheel controlling an outlet valve coupled to the cylinder, an improvement comprising the steps of: monitoring the control pulse train during each control cycle; generating at least one opening pulse for coupling to the outlet valve whenever, after a first predetermined time interval, the pulse train is absent; and stopping the generation of the opening pulse immediately upon re-occurrence of the pulse train.

Another feature of the present invention is the provision of, in an arrangement for controlling pressure in a wheel brake cylinder by a control pulse train proportional to acceleration or deceleration of an associated wheel controlling an outlet valve coupled to the cylinder, a circuit comprising: a counter continuously counting up in response to a clock pulse; a first output of the counter providing a first pulse train having a first repetition frequency after the counter has achieved a first predetermined count; the first pulse train being coupled to the outlet valve to cause a pressure decrease; and a first OR gate coupled to the first output, a reset input of the counter and the control pulse train to reset the counter.

The intervention in the control cycle which is accomplished by means of separately generated pulses causes a further defined pressure decrease as a result of which acceleration pulses are again generated in the system, thereby ensuring that the control cycle is executed again normally without delay. Thus, the invention practically eliminates the critical cases possible in antiskid systems.

A preferred embodiment of the method of this invention is characterized in that, in the absence of wheel-related deceleration and acceleration pulses while at the same time the wheel minimum velocity is not attained, a train of separately generated opening pulses of a first repetition rate is supplied to the associated outlet valve after a first time interval, and in the absence of wheel-related deceleration and acceleration pulses while at the same time the wheel minimum velocity is exceeded, a train of separately generated opening pulses of a second repetition rate less than the first repetition rate is supplied to the associated outlet valve after a second time interval which is greater than the first time interval.

By combining a wheel minimum velocity with an auxiliary pulse train occurring a relatively short time after the absence of deceleration and acceleration pulses has been determined, it is possible to make allowance for the case occurring most frequently in practice where the control cycle is initiated in the presence of such a low velocity that the wheel comes to a standstill before a sufficient pressure decrease has taken place. The auxiliary pulses which, due to the high repetition rate occur after a short period of time, ensure the necessary additional pressure decrease whereupon the control cycle is allowed to be executed again normally.

By the provision of another pulse train which is independent of the wheel minimum velocity and, compared to the first pulse train hereinabove mentioned, made available after a somewhat longer time interval related to the non-occurrence of deceleration and acceleration pulses because of the lower repetition rate allowance can likewise be made for the case occurring in practice where the pressure decrease attains exactly the magnitude at which the wheel does not decelerate further, yet does not accelerate again sufficiently. In order to make the system leave this critical state, a minor pressure decrease caused by this second pulse train will suffice because then the wheel concerned is allowed to accelerate again, the signals required for the control cycle are again available.

In another embodiment, in the absence of wheel-related deceleration and acceleration pulses while at the same time the wheel minimum velocity is not attained, a train of separately generated opening pulses of a first repetition rate is supplied to the associated outlet valve after a first time interval, and after a second time interval which is greater than the first time interval, a train of likewise separately generated opening pulses of a second repetition rate less than the first repetition rate is supplied. Such an arrangement is particularly suitable if, contrary to expectation, no wheel-related deceleration or acceleration pulse occurs after the outlet valve has been driven by pulses with the lower repetition rate. In this case, the second repetition rate causes the pressure decrease to be accelerated in order to prevent the wheel from being kept in an undefined state too long.

An advantageous circuit configuration for implementing the method of this invention is characterized by a counter continuously counting up in response to a clock having a repetition frequency and providing, from a predetermined count on, an output signal which is supplied, if necessary in amplified form, to the outlet valve for effecting a pressure decrease, with the reset input of the counter having applied to it the counter output signal, or the pulses indicative of a positive or negative wheel acceleration via an OR gate.

In an improvement of the invention, a counter signal is preferably supplied to one input of an AND gate which has applied to its other input a signal if the wheel velocity is below a predetermined limit, and the output signal of the AND gate is supplied to the outlet valve and the OR gate which has its output connected to the reset input of the counter.

Finally, another particularly advantageous circuit configuration of the invention is characterized in that a clocked counter is provided having a first output issuing a fixed-rate pulse train, a second output likewise issuing a fixed rate pulse train, yet at a lower repetition rate, and a reset input, in that the first output is connected to one input of an AND gate which has applied to its other input a signal indicative of the non-attainment of a wheel minimum velocity, in that the output of the AND gate is connected to one input of an OR gate having applied to its other input the second output of the counter, and in that the OR gate output leading to the associated outlet valve is connected to the reset input of the counter via another OR gate having applied to two additional inputs pulses indicative of a positive or negative wheel acceleration.

SUMMARY OF THE INVENTION

The above-mentioned and other features and objects of the present invention and the manner of obtaining them will become apparent by reference to the following description taken in conjunction with the drawing, the single FIGURE of which illustrates a block diagram of a digital embodiment of a circuit for carrying out the method of the present invention.

DESCRIPTION OF THE PREFERRED EMBODIMENT

In the FIGURE, a counter 10 is provided which is driven by clock pulses at a terminal 11 and counts up continuously.

After every $n_1$ count steps, a pulse is delivered to an output 12 of counter 10 so that a pulse train of a repetition rate $f_1$ is present on this output 12.

After every $n_2$ count steps, a pulse is delivered to an output 13 of counter 10 so that a pulse train of a repetition rate $f_2$ is present on this output 13.

Because $n_1$ is less than $n_2$, the pulse train present on output 12 has a greater repetition rate than the pulse train present on output 13.

Output 12 is connected to an input of an AND gate 14 which has another input 15 to which a pulse ensuring the passage of the pulse train arriving from counter output 12 through gate 14 is supplied whenever the velocity $V_{RAD}$ of the wheel concerned is less than a predetermined minimum velocity $V_{min}$.

The output of AND gate 14 is connected to an input of an OR gate 16 having its other input connected to output 13 of counter 10. The output of OR gate 16 is, on the one hand, connected to the associated outlet valve, or the drive circuit of this outlet valve, and, on the other hand, to an input of another OR gate 18 via a line 17. OR gate 18 receives on its additional inputs 20 and 21 pulse trains corresponding to the wheel deceleration or wheel acceleration. These pulse trains, however, are supplied to input terminals 20 and 21 after the deceleration or acceleration has exceeded a predeterminable threshold level.

The output of OR gate 18 is connected to a reset input 19 of counter 10.

The operation of this circuit configuration is as follows. As long as pulses corresponding to the deceleration or acceleration are present on OR gate 18, the continuously working counter 10 will always be reset to zero so that the counts $n_1$ and $n_2$, in particular $n_2$, are not reached under normal operating conditions and, accordingly, no signal is present on the output of OR gate 16.

If during a period of time in which counter 10 counts up to at least $n_1$ no signals appear at terminals 20 or 21 which are indicative of a deceleration or acceleration, and if at the same time the wheel velocity is less than the predetermined minimum velocity, AND gate 14 will open, permitting passage of the pulses present on counter output 12 to the output of OR gate 16. The signals appearing at the output of OR gate 16 go, on the one hand, to the associated outlet valve and, on the other hand, to the reset input 19. The arrival of such a pulse causes the outlet valve to open momentarily, resulting in a pressure decrease in the associated wheel brake cylinder. Via reset input 19, the counter is at the same time reset to zero so that a new count cycle may start with a signal being again issued when count $n_1$ is reached. This process is repeated either until the wheel velocity is equal to or greater than the predetermined minimum velocity and/or until acceleration pulses appear again at input terminal 21 which reset the counter to zero before count $n_1$ is reached.

Counter output 13 will take effect if in practical operation the pressure decrease that has occurred in the wheel brake cylinder attains exactly the level at which the associated wheel does not decelerate further, yet has not started accelerating again sufficiently. In this event, the wheel velocity $V_{RAD}$ is generally greater than the predeterminable minimum velocity $V_{min}$ so that AND gate 14 remains closed (no signal at the output of AND gate 14). However, because neither deceleration pulses nor acceleration pulses occur at terminals 20 and 21, counter 10 is allowed to count up to $n_2$, and at this moment opening pulses for the outlet valve will again appear at the output of OR gate 16, the opening pulses being a pulse train of repetition rate $f_2$ because of the counter being reset via line 17. These drive pulses will continue to be supplied to the outlet valve until acceleration pulses are again present on gate 18.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a method for controlling pressure in a wheel brake cylinder by a control pulse train proportional to acceleration or deceleration of an associated wheel controlling an outlet valve coupled to said cylinder, an improvement comprising the steps of:

monitoring said control pulse train during each control cycle;

generating at least one opening pulse for coupling to said outlet valve whenever, after a first predetermined time interval, said pulse train is absent; and stopping the generation of said opening pulse immediately upon re-occurrence of said pulse train.

2. In a method according to claim 1, wherein said opening pulse is an opening pulse train having a first fixed repetition rate.

3. In a method according to claims 1 or 2, wherein said step of generating includes generating said opening pulse only if at the same time the velocity of said associated wheel is less than a predetermined minimum velocity.

4. In a method according to claim 1, wherein said step of generating includes generating said opening pulse as a first pulse train having a first repetition frequency only if at the same time the velocity of said associated wheel is less than a predetermined minimum velocity, and generating, for coupling to said outlet valve, a second pulse train having a second repetition frequency less than said first repetition frequency after a second predetermined time interval greater than said first time interval whenever said control pulse train is absent and the velocity of said associated wheel is greater than said minimum velocity.

5. In a method according to claim 1, wherein said step of generating includes generating said opening pulse as a first pulse train having a first repetition frequency only if at the same time the velocity of said associated wheel has not reached a predetermined minimum velocity, and generating, for coupling to said outlet valve, a second pulse train having a second repetition frequency less than said first repetition frequency after a second predetermined time interval greater than said first time interval whenever said control pulse train is absent and the velocity of said associated wheel has not reached said minimum velocity.

6. In an arrangement for controlling pressure in a wheel brake cylinder in response to control pulse trains proportional to acceleration and deceleration of an associated wheel, a circuit comprising:

an input terminal for each of said control pulse trains;

an output terminal coupled to an outlet valve coupled to said cylinder to control pressure in said cylinder;

a first OR gate having three inputs and an output, two of said three inputs each being coupled to a different one of said input terminals;

a counter including a first output, a clock input coupled to a clock and a reset input coupled to said output of said first OR gate, said counter continuously counting up in response to said clock to provide a first pulse train having a first repetition frequency at said first output whenever, after a first predetermined time interval, said control pulse trains are absent; and means to couple said first pulse train to said output terminal to control said outlet valve and to the third of said three inputs of said first OR gate to reset said counter.

7. In an arrangement according to claim 6, wherein said means includes an AND gate having a first input coupled to said first output, a second input receiving a velocity signal when the velocity of said associated wheel is below a predetermined minimum velocity and an output coupled to said output terminal and said third of said three inputs of said first OR gate, said AND gate providing said first pulse train at its output only if simultaneously said velocity signal is present.

8. In an arrangement according to claim 6, wherein said counter further includes a second output at which said counter provides a second pulse train having a second repetition frequency lower than said first repetition frequency whenever, after a second predetermined time interval greater than said first time interval, said control pulse trains are absent, and said means includes an AND gate having an output, a first input coupled to said first output and a second input receiving a velocity signal when the velocity of said associated wheel is below a predetermined minimum velocity, said AND gate providing said first pulse train at its output only if simultaneously said velocity signal is present, and a second OR gate having a first input coupled to said output of said AND gate, a second input coupled to said second output and an output coupled to said output terminal and said third of said three inputs of said first OR gate.

* * * * *